(12) United States Patent
Chen

(10) Patent No.: US 7,595,719 B2
(45) Date of Patent: Sep. 29, 2009

(54) METHOD AND APPARATUS FOR SECURING CAR AGAINST THEFT VIA WIRELESS SENSOR

(76) Inventor: Tse Hsing Chen, 14Fl., No. 736 Chung-Cheng Rd., Chung-Ho City, Taipei Hsien (TW) 23511

( * ) Notice: Subject to any disclaimer, the term of this patent is extended or adjusted under 35 U.S.C. 154(b) by 249 days.

(21) Appl. No.: 11/595,944

(22) Filed: Nov. 13, 2006

(65) Prior Publication Data

US 2007/0109108 A1 May 17, 2007

(30) Foreign Application Priority Data

Nov. 15, 2005 (TW) .............................. 94140074 A

(51) Int. Cl.
*B60R 25/10* (2006.01)
(52) U.S. Cl. ............... 340/426.24; 340/426.1; 340/426.26; 340/426.25; 340/541
(58) Field of Classification Search .......... 340/426.24, 340/426.1, 426.26, 426.3, 429, 426.16, 426.18, 340/426.25, 693.1, 693.5, 541, 545.3
See application file for complete search history.

(56) References Cited

U.S. PATENT DOCUMENTS 6,730,928 B2 * 5/2004 Wyeth et al. .................. 257/3
6,762,676 B2 * 7/2004 Teowee et al. ............ 340/426.1
6,927,675 B2 * 8/2005 Losee ....................... 340/426.1
7,315,237 B2 * 1/2008 Shimonomoto et al. ... 340/426.1

FOREIGN PATENT DOCUMENTS

JP 2006199254 A * 8/2006

* cited by examiner

*Primary Examiner*—Toan N Pham
(74) *Attorney, Agent, or Firm*—Bacon & Thomas PLLC

(57) ABSTRACT

In a method and apparatus for securing car against theft via wireless sensor, a charging circuit and chargeable battery, a CPU circuit connected to a transmission circuit, and an air pressure sensor or an infrared sensor are provided in a cigarette-lighter plug, so that the sensor detects any change of air pressure or any change of temperature in a car due to any invader, and sends a trigger signal to the CPU circuit. The signal is encoded at the CPU circuit and then transmitted via the transmission circuit to a wireless antitheft main unit mounted in the car to trigger a siren as a warning if main unit is set to active stale by external remote control transmitter. Since no wire is needed between the sensor and the main unit, a thief is prevented from locating the main unit by tracing any wire extended thereto.

4 Claims, 5 Drawing Sheets

METHOD AND APPARATUS FOR SECURING CAR AGAINST THEFT VIA WIRELESS SENSOR

FIELD OF THE INVENTION

The present invention relates to a method and apparatus for securing car against theft via wireless sensor, and more particularly to a method and apparatus for securing car against theft via a cigarette-lighter plug having a wireless sensor built therein and an antitheft main unit mounted in a car for wirelessly receiving coded signal from the cigarette-lighter plug to trigger a siren.

BACKGROUND OF THE INVENTION

There are various kinds of detecting sensors for using in currently commercially available car security systems. These sensors may be built in an antitheft main unit of the car security systems, or externally connected to the antitheft main units via wires. Most of the built-in sensors are designed to detect vibration and change of battery voltage of the cars. When any car door is opened, the car is vibrated, and a door light is on to result in minor change in the battery voltage of the car. Therefore, it is possible to detect an opened door through the change in battery voltage of the car. However, a chemical change in the battery or an automatic actuation of the cooling fan in a turbo car would also result in the change of battery voltage. Besides, a door light might not become on when the door is opened due to poor contact of the door light. In this case, the change of battery voltage due to an opened car door is very possibly lower than a preset triggering value and fails to trigger the car security system.

A sensor mounted outside the antitheft main unit may be a vibrating sensor, an ultrasonic sensor, or a microwave sensor. Ultrasonic and microwave sensors are used to detect any movement of any object in the car, and usually consume relatively high power. All these types of sensors have a common point, that is, they are connected to the main unit via wires, and the main unit can be easily located by a thief by tracing the wires.

There is developed a new type of steering wheel lock having a vibrating, an air pressure, or an infrared sensor built therein. The air pressure sensor is able to detect changes of air pressure in a car when a door is opened. The infrared sensor is used to detect changes of temperature in a car due to an invader. These types of sensors built in the steering wheel lock have the advantage of low power consumption. However, the steering wheel lock with the built-in sensor must be internally provided with batteries, which require frequent replacement to cause inconveniences to the user. And, it is embarrassing if the user fails to get new batteries when the old ones are exhausted. Alternatively, if it desired for the steering wheel lock with built-in sensor to be internally provided with chargeable batteries, a wire must be extended from the steering wheel lock to the cigarette-lighter socket to obtain power supply for charging the batteries. Therefore, it is inevitable to frequently plug and unplug the steering wheel lock into and from the cigarette-lighter socket. Moreover, it is uneasy to find a suitable place in the quite small interior of car to position the steering wheel lock, which has a considerably big volume, when the steering wheel lock is plugged in the cigarette-lighter socket and charged when the car is moving, particularly when the wire connecting the steering wheel lock to the cigarette-lighter socket is short. The wire extended from the steering wheel lock also tends to unexpectedly loosen from the cigarette-lighter socket and dangerously hinders the driver's feet.

There are also antitheft main units with the air pressure or the infrared sensor built therein. The main unit may be clipped to a flip-down sun visor or a dashboard, and is internally provided with general batteries to supply power needed by the main unit to operate normally. The batteries must be replaced now and then. When chargeable batteries are used to replace the general batteries, the user has to troublesomely connect a wire from a power source in the car to the main unit for charging the batteries.

It is therefore tried by the inventor to develop a method and apparatus for securing car against theft via wireless sensor to overcome the disadvantages existed in the conventional car security systems.

SUMMARY OF THE INVENTION

A primary object of the present invention is to provide a method and apparatus for securing car against theft via wireless sensor, so that no wire is needed between the sensor and an antitheft main unit mounted in the car, protecting the main unit from being located by tracing any wire extended thereto.

To achieve the above and other objects, the method for securing car against theft via wireless sensor according to the present invention includes the steps of providing a charging circuit and a chargeable battery, a CPU circuit, a transmission circuit, and an air pressure sensor or an infrared sensor in a cigarette-lighter plug; mounting and connecting an antitheft main unit to a power source in a car; setting the main unit to an active state; plugging the cigarette-lighter plug in a cigarette-lighter socket on the car, so that the air pressure or infrared sensor built in said cigarette-lighter plug detects any change of air pressure or temperature, respectively, in the car due to any invader, and sends out a signal to the CPU circuit; encoding the signal sent by the air pressure or infrared sensor at the CPU circuit; and transmitting the encoded trigger signal via the transmission circuit to the antitheft main unit to trigger a siren.

The apparatus for securing car against theft via wireless sensor according to the present invention includes a cigarette-lighter plug and an antitheft main unit. The cigarette-lighter plug is plugged in a cigarette-lighter socket on a car, and internally provided with a charging circuit and chargeable battery, a CPU circuit, a transmission circuit connected to the CPU circuit, and a wireless air pressure or infrared sensor. The charging circuit and the chargeable battery are charging when the car engine is running, and adapted to supply power to the cigarette-lighter plug when the car is in an unmoved state. The wireless air pressure or infrared sensor is adapted to detect any change of air pressure or temperature, respectively, in the car due to an invader and send out a trigger signal to the CPU circuit. The CPU circuit is adapted to encode the trigger signal sent by the wireless sensor. And, the transmission circuit is adapted to transmit the signal coded by the CPU circuit to the antitheft main unit. The antitheft main unit is mounted on and connected to a power source of the car, and adapted to receive the coded trigger signal from the transmission circuit in the cigarette-lighter plug to trigger a siren electrically connected to the main unit.

Since no wire is needed between the antitheft main unit and the cigarette-lighter plug with built-in wireless sensor, a thief could not locate and damage the antitheft main unit by tracing any wire.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
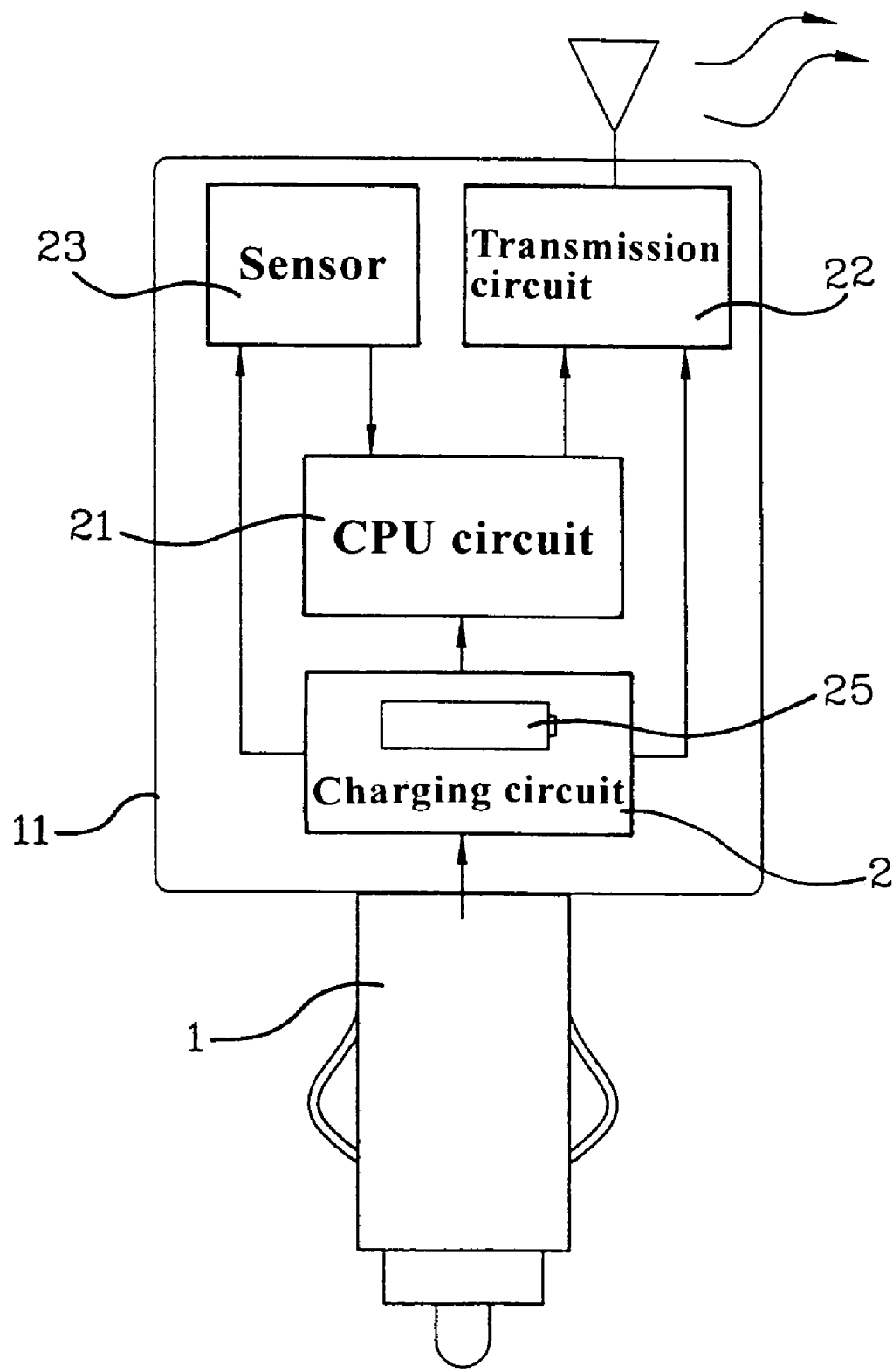
FIG. 1 is a block diagram of a cigarette-lighter plug included in an apparatus for securing car against theft via wireless sensor according to the present invention.
Figure 2:
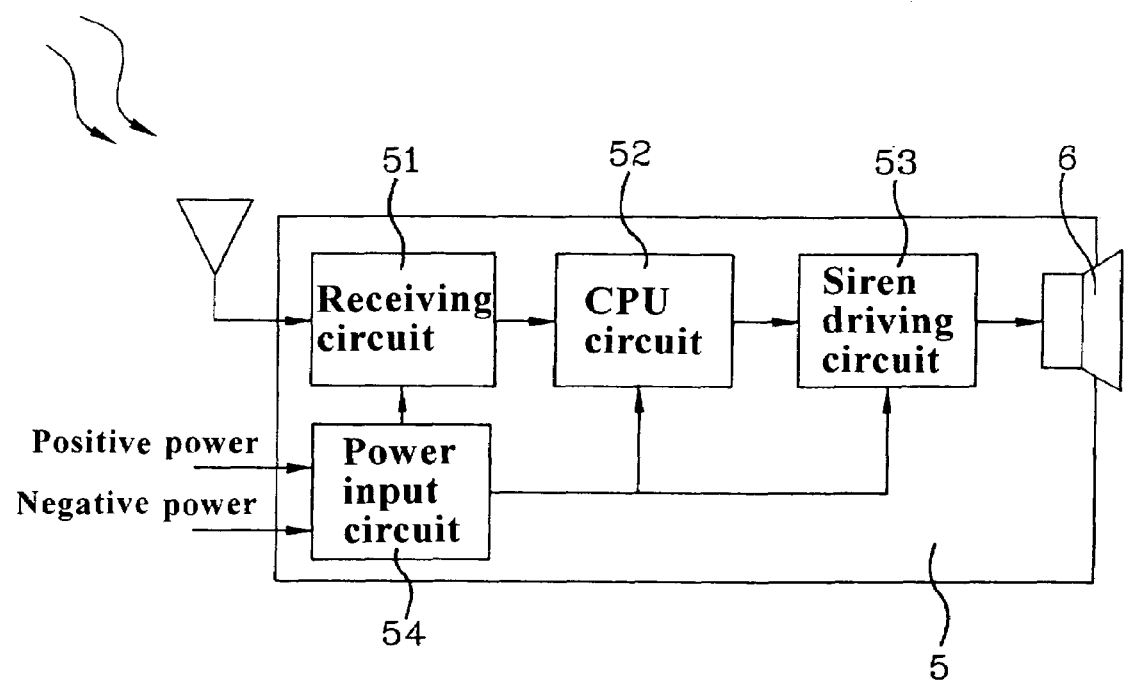
FIG. 2 is a block diagram of a wireless main unit of the apparatus for securing car against theft via wireless sensor according to the present invention.

Please refer to FIGS. 1 through 5. In a method for securing car against theft via wireless sensor, a cigarette-lighter plug 1 on a car is internally provided with a charging circuit 2 including a chargeable battery 25, a CPU circuit 21 connected to a transmission circuit 22, and an air pressure or infrared sensor 23. The sensor 23 detects any changes of air pressure or temperature in the car, and sends a trigger signal to the CPU circuit 21. The signal is encoded at the CPU circuit 21 and then transmitted via the transmission circuit 22 to a wireless anti-theft main unit 5 mounted in the car. There is not any wire extended between the sensor 23 and the main unit 5, preventing a thief from locating the exact position of the main unit 5 in the car. With the method of the present invention, an anti-theft system in a car can be triggered simply via effective detection of changes of air pressure or temperature in the car using a wireless sensor.

An apparatus for securing car against theft via wireless sensor according to the present invention includes a cigarette-lighter plug 1 and an antitheft main unit 5 mounted in a car.

The cigarette-lighter plug 1 has a housing 11 internally provided with a first CPU circuit 21 for coding a trigger signal for transmission and controlling the whole cigarette-lighter plug 1, a transmission circuit 22 connected to the first CPU circuit 21 for transmitting the coded trigger signal, a sensor 23 connected to the first CPU circuit 21 for detecting changes of air pressure or temperature in the car; and a charging circuit 2 being connected to an input of the cigarette-lighter plug 1 and including a chargeable battery 25 for supplying power needed by all the circuits in the housing 11 of the cigarette-lighter plug 1.

The antitheft main unit 5 is internally provided with a receiving circuit 51 for receiving coded trigger signal from the transmission circuit 22 in the cigarette-lighter plug 1 and instruction from external transmitter, a second CPU circuit 52, a siren driving circuit 53, and a power input circuit 54.

The cigarette-lighter plug 1 with the transmission circuit 22, the sensor 23, and the chargeable battery 25 built therein can be easily and conveniently installed. A user needs only to plug the cigarette-lighter plug 1 having a built-in wireless sensor in a cigarette-lighter socket on the car, and the cigarette-lighter plug 1 is automatically charged when the car engine is running. The built-in chargeable battery 25 continues to supply power to the cigarette-lighter plug 1 when the car engine is in off state. To enable extended days of standby and reduced volume, a power-economy sensor 23 may be adopted for use in the present invention. It is not necessary to install any wire between the sensor 23 and the antitheft main unit 5.

Figure 3:
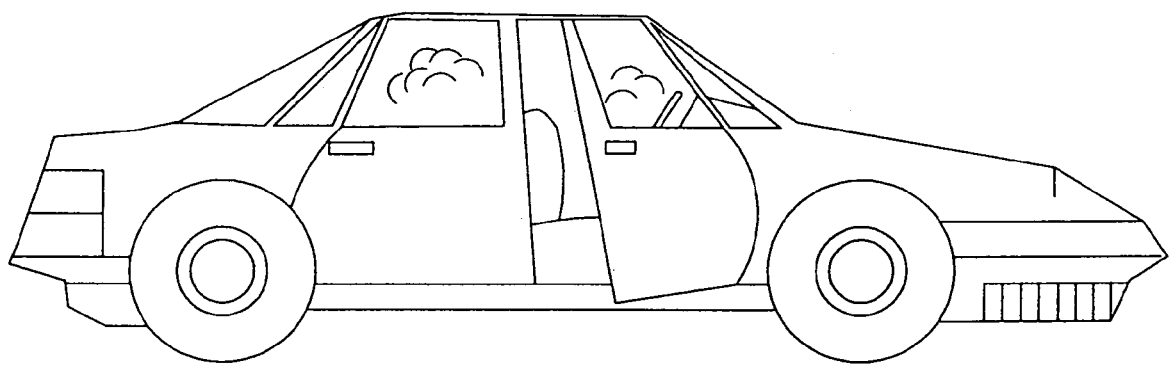
FIG. 3 schematically shows an example of application of the method and apparatus for securing car against theft via wireless sensor according to the present invention.
Figure 4:
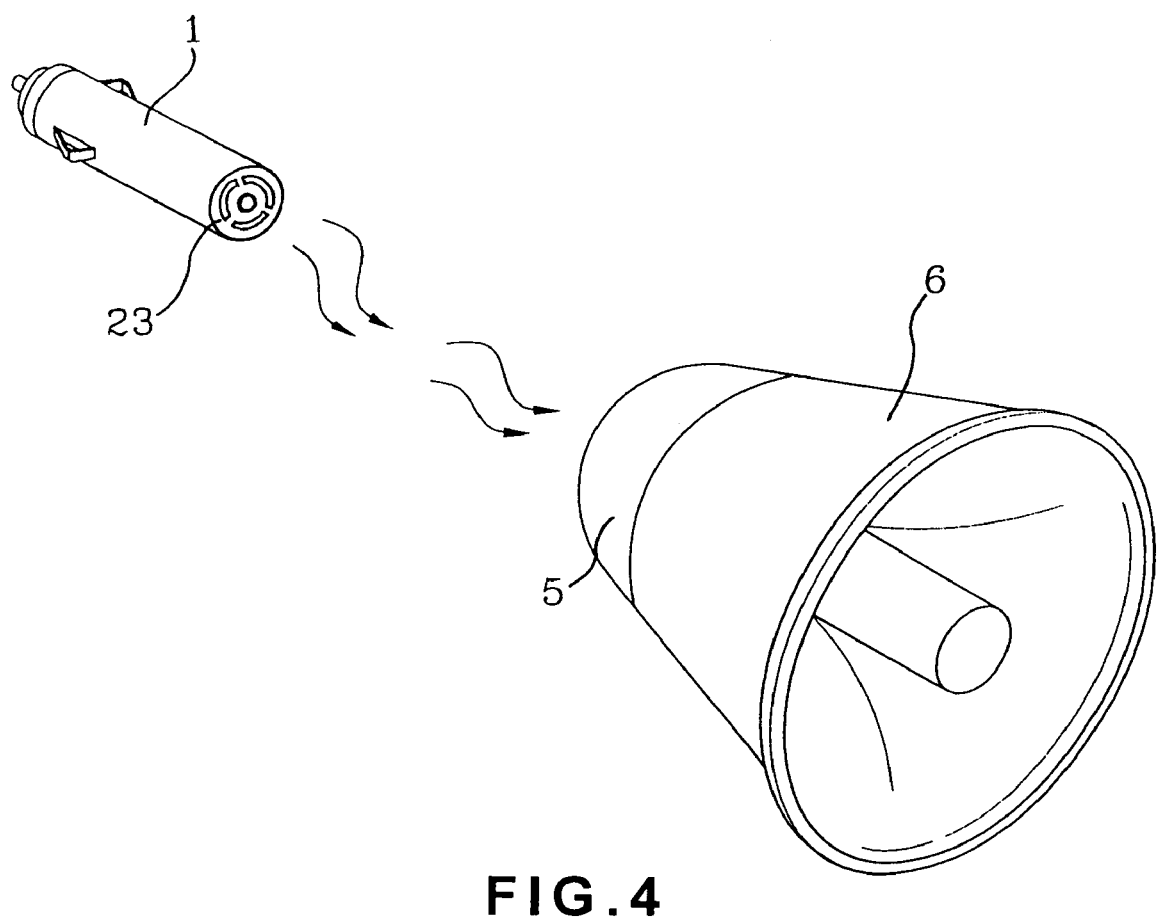
FIG. 4 schematically shows the operation of the method and apparatus for securing car against theft via wireless sensor according to the present invention.
Figure 5:
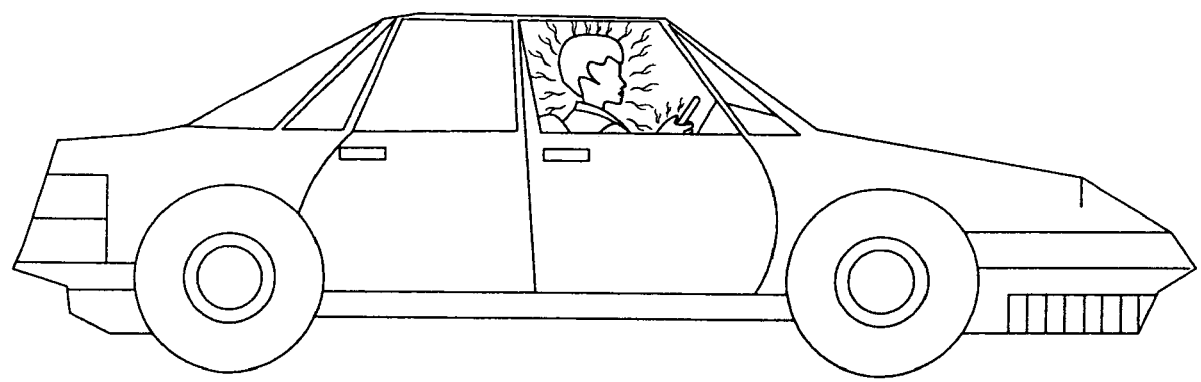
FIG. 5 schematically shows another example of application of the method and apparatus for securing car against theft via wireless sensor according to the present invention.

FIG. 3 shows an air pressure sensor 23 is adopted to detect any change of air pressure in the car due to opening of any door and trunk lid, or broken window glass, or big vibration of the car. And, FIG. 5 shows an infrared sensor 23 is adopted to detect any change of temperature in the car due to any invader. The sensor 23 sends a signal of such change of air pressure or temperature in the car to the CPU circuit 21. The CPU circuit 21 encodes the received signal, and the coded trigger signal is transmitted via the transmission circuit 22 to the receiving circuit 51 of the antitheft main unit 5. The receiving circuit 51 is built in a siren 6. By connecting the main unit 5 to batteries of the car, it is possible for the main unit 5 to receive a remote control signal and to trigger an antitheft signal. When the main unit 5 is set to an active state via a remote transmitter, it would trigger the siren 6 to buzz when it receives a correctly coded triggering signal from the sensor 23.

The following are some of the advantages of the present invention:

1. The sensor is directly built in the cigarette-lighter plug without any external wire. A user needs not to find other place in the car for mounting the sensor and is not subject to any potential danger in driving due to poor connection of the sensor to a power source via any wire.
2. A user needs only to plug the cigarette-lighter plug into the cigarette-lighter socket on the car and electrically connects the antitheft main unit and the siren thereof to the batteries of the car to complete the installation of the antitheft apparatus of the present invention. The installing procedures are simple and convenient.
3. After the antitheft main unit has been set to an active state, the siren would be triggered whenever there is any invader. The sensor built in the cigarette-lighter plug is not easily located and may be particularly camouflaged when necessary. For example, differently shaped hollow ornaments, such as a mini hat, may be put on an upper end of the cigarette-lighter plug without blocking the sensor.
4. The apparatus may be internally programmed, so that the siren would still buzz even if the sensor is located and the cigarette-lighter plug is plugged out and discarded. The thief could not locate and damage the antitheft main unit by tracing any wire.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method for securing car against theft via wireless sensor, comprising the steps of providing a charging circuit and a chargeable battery, a CPU circuit, a transmission circuit, and an air pressure sensor in a cigarette-lighter plug; mounting and connecting an antitheft main unit to a power source in a car; setting said main unit to an active state;

plugging said cigarette-lighter plug in a cigarette-lighter socket on the car, so that said air pressure sensor built in said cigarette-lighter plug detects any change of air pressure in the car due to door open, trunk open, glass broken, big shock and sends out a trigger signal to said CPU circuit; encoding said trigger signal sent by said air pressure sensor at said CPU circuit; and transmitting said encoded trigger signal via said transmission circuit to said antitheft main unit to trigger a siren.

2. A method for securing car against theft via wireless sensor, comprising the steps of providing a charging circuit and a chargeable battery, a CPU circuit, a transmission circuit, and an infrared sensor in a cigarette-lighter plug; mounting and connecting an antitheft main unit to a power source in a car; setting said main unit to an active state; plugging said cigarette-lighter plug in a cigarette-lighter socket on the car, so that said infrared sensor built in said cigarette-lighter plug detects any change of temperature in the car due to any invader, and sends out a trigger signal to said CPU circuit; encoding said trigger signal sent by said infrared sensor at said CPU circuit; and transmitting said encoded trigger signal via said transmission circuit to said antitheft main unit to trigger a siren.

3. An apparatus for securing car against theft via wireless sensor, comprising a cigarette-lighter plug and an antitheft main unit;

said cigarette-lighter plug being plugged in a cigarette-lighter socket on a car, and internally provided with a charging circuit and chargeable battery, a CPU circuit, a transmission circuit connected to said CPU circuit, and a wireless air pressure sensor; said charging circuit and said chargeable battery being charged when the car engine is running or ignition key is on, and adapted to supply power to said cigarette-lighter plug when the car engine is off or ignition key is off; said wireless air pressure sensor being adapted to detect any change of air pressure in the car and send out a trigger signal to said CPU circuit; said CPU circuit being adapted to encode said trigger signal sent by said wireless air pressure sensor; and said transmission circuit being adapted to transmit the trigger signal coded by said CPU circuit to said antitheft main unit; and said antitheft main unit being mounted on and connected to a power source of the car, and adapted to receive said coded trigger signal from said transmission circuit in said cigarette-lighter plug to trigger a siren electrically connected to said main unit.

4. An apparatus for securing car against theft via wireless sensor, comprising a cigarette-lighter plug and an antitheft main unit;

said cigarette-lighter plug being plugged in a cigarette-lighter socket on a car, and internally provided with a charging circuit and chargeable battery, a CPU circuit, a transmission circuit connected to said CPU circuit, and a wireless infrared sensor; said chargeable circuit and said charging battery being charged when the car engine is running or ignition key is on, and adapted to supply power to said cigarette-lighter plug when the car engine is off or ignition key is off; said wireless infrared sensor being adapted to detect any change of temperature in the car due to an invader and send out a trigger signal to said CPU circuit; said CPU circuit being adapted to encode said trigger signal sent by said wireless infrared sensor; and said transmission circuit being adapted to transmit the trigger signal coded by said CPU circuit to said antitheft main unit; and said antitheft main unit being mounted on and connected to a power source of the car, and adapted to receive said coded trigger signal from said transmission circuit in said cigarette-lighter plug to trigger a siren electrically connected to said main unit.

* * * * *